United States Patent [19]

Lustig

[11] 3,879,330

[45] Apr. 22, 1975

[54] FOOD WRAP HAVING LOW OXYGEN PERMEABILITY AND DESIRABLE ELASTIC PROPERTIES

[75] Inventor: Stanley Lustig, Park Forest, Ill.

[73] Assignee: Union Carbide Corporation, New York, N.Y.

[22] Filed: Mar. 17, 1972

[21] Appl. No.: 235,652

[52] U.S. Cl... 260/31.8 M; 260/859 R; 260/859 PV
[51] Int. Cl................ C08g 41/04; C08g 51/38
[58] Field of Search..... 260/859 R, 859 PV, 31.8 M

[56] References Cited
UNITED STATES PATENTS

| 3,144,352 | 8/1964 | Talley | 260/859 |
|---|---|---|---|
| 3,357,939 | 12/1967 | Reischl | 260/859 |
| 3,444,266 | 5/1969 | Reischl | 260/859 |
| 3,622,439 | 11/1971 | Manne | 260/859 |
| 3,637,553 | 1/1972 | Keberle | 260/859 |
| 3,646,178 | 2/1972 | Traubel | 260/859 |

OTHER PUBLICATIONS

The Condensed Chemical Dictionary, 8th edition, Van Nostrand Reinhold Co., New York, received at U.S. Patent Office July 6, 1971, page 353.

*Primary Examiner*—Joseph L. Schofer
*Assistant Examiner*—Paul R. Michl
*Attorney, Agent, or Firm*—Clement J. Vicari

[57] ABSTRACT

A food wrap is disclosed which has a desirable balance of properties including low oxygen permeability and good elastic properties. The food wrap is composed of a thermoplastic urethane polymer and a vinylidene chloride polymer.

17 Claims, No Drawings

FOOD WRAP HAVING LOW OXYGEN PERMEABILITY AND DESIRABLE ELASTIC PROPERTIES

The invention relates to a food wrap, and more particularly, to a food wrap having a desirable balance of properties. The food wrap of the invention combines excellent oxygen barrier properties with good elastic properties.

Elastic films have certain desirable characteristics for use as a food wrap. Their stretchable character plus elastic return provide versatility in terms of the size range of materials which can be packaged in a given size bag by altering the degree of stretching, and gives close conformation to the shape of the packaged product. However, there is at present no commercial food wrap film having desirable elastic properties and, at the same time, having sufficient oxygen barrier properties to permit a vacuum to be retained inside the package during the period of time occurring between packaging and sale of the food. Thus, the present elastic food wrap films provide insufficient protection of the food packaged therein from spoilage and loss of color which results from exposure to the oxygen in the air.

The present invention is addressed to the preparation of an elastic food wrap that also has desirable oxygen barrier properties such that foods packaged therein can be stored for relatively long periods of time without excessive risk of spoilage and color change owing to exposure to atmospheric oxygen.

Accordingly, it is an object of this invention to provide an elastic food wrap film having good oxygen barrier properties.

Another object of this invention is the provision of a food wrap composed of a vinylidene chloride polymer and a thermoplastic urethane polymer.

It is a further object of the invention to provide a food wrap having a desirable balance of properties.

An additional object of the invention is to provide a food wrap composed of a mixture of a vinylidene chloride polymer and a thermoplastic urethane polymer, wherein said food wrap has both good elastic properties and desirable oxygen barrier properties.

Other advantages and objects of this invention will become apparent from a reading of the following description of the invention.

The food wrap of the invention comprises a film composed of a thermoplastic urethane polymer and a vinylidene chloride polymer, in proportions that are defined more particularly herein below, wherein said film has an oxygen permeability, as determined by ASTM-1434-66, of less than about 30 cc. -mil/100 sq. in./24 hrs./atmosphere, and an elasticity such that the film shows less than 10 per cent permanent deformation when stretched to 50 per cent elongation at 40°F.

The food wrap film of the invention contains a thermoplastic urethane polymer. As is well known in the art, thermoplastic urethane polymers are produced by reacting essentially equivalent amounts of a diol with an organic diisocyanate. The diol contains at least one relatively high molecular weight diol, and will normally contain a low molecular weight or monomeric diol. Organic diisocyanates which are useful in the preparation of thermoplastic urethane polymers include tolylene diisocyanate, bis(4-isocyanatophenyl)methane ("MDI"), and other organic diisocyanates that are known in the art. MDI is a preferred organic diisocyanate for the peparation ot thermoplastic urethane polymers.

The polyol or polyol mixture that is employed in preparing thermoplastic urethane polymers includes at least one relatively high molecular weight diol. Such diols can be the reaction products of an excess of a dihydric alcohol with a dicarboxylic acid, such as those polyesters prepared by reacting an excess of ethylene glycol, propylene glycol, or diethylene glycol, with adipic acid or terephthalic acid. Another type of high molecular weight diol that can be employed are the polylactone diols such as those that are prepared by the reaction of epsilon-caprolactone with a difunctional initiator such as a dihydric alcohol, a diamine, or an amino alcohol. Examples of useful difunctional initiators include ethylene glycol, diethylene glycol, 1,4-butane diol, hexamethylene glycol, ethanolamine, ehtylene diamine, and 1,3-propanediamine. Still another type of relatively high molecular weight diol that can be employed in the preparation of the thermoplastic urethane polymer are the polyether diols. Polyether diols are prepared, for example, by reacting an alkylene oxide such as ethylene oxide, propylene oxide, butylene oxide, or mixtures thereof with a difunctional initiator such as ethylene glycol or diethylene glycol. Another type of useful polyether diol is that which is prepared by the polymerization of tetrahydrofuran to produce polytetramethylene glycol. The relatively high molecular weight diol is employed in producing the thermoplastic urethane polymer will usually have a molecular weight in excess of about 700, and up to, for example, about 2,000.

The diol that is employed in poducing the thermoplastic urethane polymer can also contain a relatively low molecular weight or a monomeric diol. Such diols include 1,4-butane diol, ethylene glycol, diethylene glycol and triethylene glycol.

As was mentioned above, the nature and preparation of thermoplastic urethane polymers is well known to the art. The preferred thermoplastic urethane polymers include those that comprise the reaction products of MDI, a polyester produced by reacting an excess of ethylene glycol with adipic acid, and 1,4-butane diol. Such thermoplastic urethane polymers are available commercially under the trade name of "ESTANE," from the B. F. Goodrich Company.

The second major ingredient in the preparation of the food wrap films of the invention is a vinylidene chloride polymer. Vinylidene chloride polymers are known to the art, and those which are employed in the present invention are those that contain a minimum of at least about 50 weight per cent, and more usually at least about 65 weight per cent, of polymerized vinylidene chloride. In general, the vinylidene chloride polymer contains not more than about 95 per cent vinylidene chloride, and in most cases, not more than about 90 per cent vinylidene chloride units (based upon weight of polymer), because the vinylidene chloride polymers containing close to 100 per cent vinylidene chloride are difficult to process on conventional film forming equipment. Among the comonomers that can be present in the vinylidene chloride polymers of the invention are one or more of vinyl chloride, alkyl acrylates such as methyl acrylate, ethyl acrylate, and other alkyl acrylates, alkyl methacrylates such as methyl methacrylate, ethyl methacrylate, and other alkyl methacrylates, and acrylonitrile. A preferred comonomer is vinyl chloride. The nature and preparation of such vinylidene chloride polymers are well known to the art.

In general, the vinylidene chloride polymers that are employed in the invention can be described as being extrusion grade polymers. Such vinylidene chloride polymers are also sufficiently heat stable to be heat processed through conventional film-forming extrusion equipment, and are relatively free of gel specks and other deficiencies which are undesirable in the preparation of a film. Such extrusion grade vinylidene chloride polymers are known to the art.

The preferred vinylidene chloride polymers for use in the invention are those that have oxygen permeabilities (by ASTM-1434-66) of less than about 40, and more preferably less than about 30 cc. -mil/100 square inches/24 hours/atmosphere, when formed into a film (by standard methods such as extrusion) containing 92 weight per cent of the vinylidene chloride polymer and 8 weight per cent of dibutyl sebacate plasticizer. (Pure vinylidene chloride polymers, if formed into films, in most cases would have oxygen permeabilities of less than 1. However, it is very difficult to make a film from a pure vinylidene chloride polymer without a plasticizer.)

The proportions of thermoplastic urethane polymer and vinylidene polymer that are employed in the preparation of the food wrap films of the invention are selected so as to yield a film having good elastic properties as well as excellent oxygen barrier properties. The food wrap films of the invention have an oxygen permeability below about 30 cc.-mil/100 sq. in./24 hours/atmosphere, as determined by ASTM-1434-66 test procedure. Further, the films have desirable elastic properties such that they have a permanent deformation of less than about 10 per cent when stretched to 50 per cent elongation at 40° F. The permanent deformation test is carried out with a conventional laboratory scale tensile tester (such as a Table Model Instron Tensile Tester). One-inch by 5-inches film samples are used. The film is attached to the jaws of the tester, with the jaws being 2 inches apart. One jaw is then moved away at a speed of 20 inches per minute until the jaws are 3 inches apart. The jaw is then returned to the original position. Permanent deformation is the per cent increase in length (compared with the original 2-inch span between the jaws), and it is determined by returning the jaws to the original 2-inch span, moving one jaw away at a speed of 2 inches per minute, and noting the distance moved by the jaw at the point where tensile force is first indicated on the chart attached to the tester.

The nature of, and more particularly, the physical properties of, the thermoplastic urethane polymer are important factors in determining the proportion of the two polymers in the food wrap film of the invention. For instance, when the thermoplastic urethane polymer is relatively hard (e.g., when it has a Durometer A hardness of from about 90 to about 100), the food wrap of the invention will ordinarily contain a preponderant amount, for instance, from about 65 to about 95, and preferably from about 70 to about 90, weight percent of such urethane polymer. A specific illustration of this type of urethane polymer is "ESTANE" 5705, which has a Durometer A hardness of about 95, a modulus at 300 percent elongation of 4,000 psi, and an elongation of 450 per cent.

When the thermoplastic urethane polymer has an intermediate hardness (e.g., a Durometer A hardness of from about 70 to about 90), the food wrap of the invention contains approximately equal (by weight) proportions of thermoplastic urethane polymer and vinylidene chloride polymer. For instance, when such urethane polymers are employed, the food wrap will normally contain from about 35 to about 65, and preferably, from about 40 to about 60 weight percent of thermoplastic urethane polymer. a specific example of such a thermoplastic urethane is "ESTANE" 5710, which has a Durometer A hardness of about 78, a modulus at 300 percent elongation of about 1,200 psi, and an elongation of about 550 per cent.

When the thermoplastic urethane polymer of the invention has a relatively low hardness (e.g., a Durometer A hardness of from about 60 to about 70), the food wrap of the invention will contain a preponderant amount of the vinylidene chloride polymer. For instance, when such urethane polymers are employed, the food wrap will normally contain from about 15 to about 45, and preferably from about 20 to about 40, weight percent of urethane polymer. A specific illustration of such a urethane polymer is "Pellethane 2102-70AX," which has a Durometer A hardness of about 65, a modulus at 300 per cent elongation of about 550 psi, and an elongation of about 740 percent.

While the ranges of proportions set forth above are not intended to be inflexible rules for defining the proportions of the two polymers in every case, the ranges are nevertheless useful as a point of first approximation in determining the proportions. When the preferred vinylidene chloride polymers are employed, in most cases wherein thermoplastic urethane polymers having Durometer A hardnesses between about 60 and 100, the useful proportions of the two polymers will be found within the ranges as indicated above.

The food wrap films of the invention can be produced by conventional film-forming methods such as extrusion, which are well known in the art.

The food wrap films of the invention can contain conventional additives such as lubricating additives, anti-blocking agents, anti-cling agents, and the like, all of which are known in the art. To illustrate, the food wrap films of the invention typically contain up to about 3 weight per cent diatomaceous earth as an antiblocking agent and up to about 2 weight per cent of ethylene bisoleamide as a slip agent.

Typical film thickness of the food wrap films of the invention are found within the range of from about one-half to about 3 mils, although the films may be as thick as 5 mils in some cases.

The films of the invention are especially useful for fabricating bags for containing food. The bags can be fabricated by known methods, as for example, by heat sealing one end of a length of tubular film.

In the examples, a number of commercially obtained theremoplastic urethane polymers were employed. These polymers, their suppliers, and representative properties were the following: "ESTANE 5707," a polyester-based thermoplastic urethane polymer available from B. F. Goodrich Co., having the following representative properties:

| | Typical Value | ASTM No. |
|---|---|---|
| Specific Gravity | 1.20 | D12-27 |
| Hardness Durometer A | 95 | D-2240-68 |
| Durometer C | 70 | |
| Durometer D | 50 | |
| Tensile Strength (psi) | 8000 | D-412 |
| Modulus at 300% Elongation (psi) | 4000 | |
| Elongation (%) | 450 | |
| Graves Tear (lbs/in) | 700 | D-624 |
| Low-Temperature Brittleness Point (°F) | 100 | D-746 |
| Gehman Low-Temperature Freeze Point (°F) | −1 | D-1056 |
| *Compression Set-Method A 22 hours at 158°F | 11 | D-395-55 |
| Taber Abrasion (mg loss) (CS17 wheel, 1000 gms. weight, 5000 cycles) | 3 | D-1044-49T |
| Processing Stock Temperature (°F) | 350–380 | |

*Method A uses constant compression stress at constant test temperature.

"ESTANE 5710," a polyester-based thermoplastic urethane polymer available from the B. F. Goodrich Co., having the following representative properties:

| | Typical Value | ASTM No. |
|---|---|---|
| Specific Gravity | 1.2 | D12-27 |
| Hardness, Durometer A | 78 | D-2240-68 |
| Durometer C | 45 | |
| Tensile Strength (psi) | 6000 | D-412 |
| Modulus at 300% Elongation (psi) | 1200 | |
| Elongation (%) | 550 | |
| Graves Tear (lbs/in) | 340 | D-624 |
| Low-Temperature Brittleness (°F) | −80 | D-746 |
| Clash Berg, Torsional Modulus (psi X 10³) @ −60°C (%) | 0.112 | D-1043 |
| @ −40°C (%) | 0.083 | |
| @ −20°C (%) | 0.007 | |
| Compression Set, Method B | | D-1229 |
| 22 hours at 25°C (%) | 18 | |
| 22 hours at 70°C (%) | 83 | |
| Taber Abrasion (mg loss) (CS17 wheel, 1000 gms. weight, 5000 cycles) | 4 | D-1044-49T |
| Permanent Set, (%) | 9.3 | * |
| Processing Stock Temperature (°F) | 320-340 | |

* Extend @ 2.0 inches/minute to 300%; hold one minute; relax five minutes.

"ESTANE 5714," a polyether-based thermoplastic urethane polymer available from the B. F. Goodrich Company, having the following representative properties.

| | Typical Value | ASTM No. |
|---|---|---|
| Specific Gravity | 1.11 | D12-27 |
| Hardness, Durometer A | 80 | D-2240-68 |
| Tensile Strength (psi) | 6500 | D-412 |
| Modulus at 300% Elongation (psi) | 1100 | |
| Elongation (%) | 600 | |
| Graves Tear (lbs/in) (approx.) | 400 | D-624 |
| Low-Temperature Brittleness Point (°F) | −80 | D-746 |
| Gehman Low-Temperature Freeze Point (°F) | −50 | D-1053 |
| Taber Abrasion (mg loss) (H18 wheel, 1000 gms. weight, 2000 cycles) | 85 | D1044-49T |
| Viscosity (15% T.S. in Tetrahydrofuran Brookfield RVF Viscometer, No. 2 Spindle, 20 rpm, 25°C), cps | 600–1200 | |

"PELLETHANE 2102-70AX" — a poly(epsilon-caprolactone)-based thermoplastic urethane polymer, obtained from the CPR Division of the Upjohn Company, and having the following typical properties:

| | Typical Value |
|---|---|
| Hardness, Shore A | 65 |
| Tensile, psi | 6190 |
| Elongation, % | 740 |
| Elongation Set, % | 60 |
| Modulus, psi at | |
| 10% Elongation | 100 |
| 100% Elongation | 295 |
| 300% Elongation | 550 |
| Tear Strength, psi | |
| Die "C" | 290 |
| Split | 220 |

In the Examples, the following vinylidene chloride polymers were employed:

PVDC Polymer A

This polymer was composed of 83 weight per cent polymerized vinylidene chloride and 17 weight per cent polymerized vinyl chloride. The intrinsic viscosity of this polymer was 0.625 deciliters/gram, measured in tetrahydrofuran at 30° C. The intrinsic viscosity was determined by the procedure described in ASTM D1243-66, except that tetrahydrofuran was used as the solvent in place of cyclohexanone.

PVDC Polymer B

This polymer was composed of 85 mole per cent polymerized vinylidene chloride, 10 mole per cent polymerized vinyl chloride, and 5 mole per cent polymerized methyl acrylate. The polymer had an intrinsic viscosity of 0.572 deciliters/gram, measured in tetrahydrofuran at 30° C.

PVDC Polymer C

Same as B, except 2-ethylhexyl acrylate is substituted for methyl acrylate. The intrinsic viscosity of PVDC Polymer C was 0.557 deciliters/gram, measured in tetrahydrofuran at 30° C.

PVDC Polymer D

Same as B, except butyl acrylate is substituted for methyl acrylate. The intrinsic viscosity of PVDC Polymer D was 0.500 deciliters/gram, measured in tetrahydrofuran at 30° C.

PVDC Polymer E

Same as B, except n-octyl acrylate is substituted for methyl acrylate. The intrinsic viscosity of PVDC Polymer E was 0.517 deciliters/gram, measured in tetrahydrofuran at 30° C.

The oxygen permeabilities (by ASTM 1434-66) of films composed of 92 weight percent PVDC polymer and 8 weight percent dibutyl sebacate plasticizer of the foregoing PVDC polymers are the following:

Table I

| PVDC Polymer | Oxygen Permeability |
| --- | --- |
| A | 15–20 |
| B | 26 |
| C | 53.2 |
| D | 32.8 |
| E | 36.8 |

EXAMPLE 1

Blown films having a thickness of 1 to 2 mils were produced by conventional extrusion procedures from mixtures of varying proportions of PVDC Polymer A and a thermoplastic urethane polymer composed of 96.5 weight percent "Estane" 5710, 2 weight percent ethylene bisoleamide slip agent and 1.5 weight percent diatomaceous earth antiblock agent. The slip and antiblock additives were compounded into the "Estane" 5710 by use of a conventional compounding extruder which formed the compounded "Estane" into pellets. The pellets were supplied commercially under the name "Estane" Compound 58555. The polyvinylidene-vinyl chloride copolymer resin, which is in powder form, was compacted using a Colton Rotary press to form tablets ⅝ inch in diameter by 3/16 inch thick. The tablets were then reduced in size by granulation on a Colton granulator.

The polyurethane pellets and the PVDC granulated material were then mixed by hand in the proper proportions and used as feed to an extruder. The extruder used for the film manufacture is a conventional four zone electrically heated machine. The extruder temperature was 290° to 315° F. Tubular blown film was extruded through an annular die by conventional techniques. Take-off and wind-up equipment are standard for thin stretchable type films.

Table II displays the proportions of vinylidene chloride polymer (PVDC) and thermoplastic urethane (U) in each of the films tested, as well as the oxygen permeability (Method ASTM 1434-66) and permanent deformations at 40° F. of these films.

Table II

| Weight % PVDC/U | 0/100 | 20/80 | 30/70 | 40/60 | 50/50 | 60/40 | 80/20 | 90/10 | 95/5 | 100/0 |
| --- | --- | --- | --- | --- | --- | --- | --- | --- | --- | --- |
| Oxygen Permeability cc-mil/100 in.²/24 hrs./atm. | 91 | 57.1 | 38.8 | 25.3 | 23.3 | 6.03 | 0.5 | 0.5 | 0.5 | 0.5 |
| Permanent Deformation, MD %, at 50% | 2.55 | 4.00 | 5.0 | 6.3 | 8.05 | 8.55 | 19.5 | Broke | 35.5 | Broke |
| Elongation (40°F.) TD | 1.55 | 4.05 | 5.05 | 6.8 | 7.65 | 8.8 | 23.9 | 34.75 | Broke | Broke |

EXAMPLE 2

A series of blown films were prepared by procedures analogous to that described in Examples 1, from varying proportions of "Estane" Compound 58409 ("Estane" 5707 base resin containing conventional slip and anti-block additives) and PVDC polymer B. Table III, below, displays the proportions of the polymers in each film, and the oxygen permeability (by ASTM 1434-66) and permanent deformation properties at 40° F.

Table III

| Weight per cent PVDC/U | 0/100 | 10/90 | 20/80 | 40/60 |
| --- | --- | --- | --- | --- |
| Oxygen Permeability (cc-mil/100 in ²/24 hrs./atm) | 48.3 | 29.8 | 20.1 | 7.4 |
| Permanent Deformation, MD %, at 50% Elongation (40°F.) TD | 3.65 / 4.25 | 5.55 / 5.15 | 7.55 / 7.90 | 15.9 / 18.4 |

EXAMPLE 3

Another series of blown films were prepared by procedures analogous to that described in Example 1 from 60 weight per cent of "Estane" Compound 58555 ("Estane" 5710 conventional additives) and: (1) 40 weight per cent of PVDC Polymer C; (2) 40 weight per cent of PVDC Polymer D; and (3) 40 weight per cent of PVDC Polymer E. Table IV below displays the oxygen permeability (by ASTM 1434-66) and permanent deformation properties at 40° F.

TABLE IV

| Run No. Weight Percent | (1) | (2) | (3) |
| --- | --- | --- | --- |
| PVDC/U | 40/60 | 40/60 | 40/60 |
| Oxygen Permeability, cc-mil/100 in.²/24 hrs. /atm. | 45.7 | 29.9 | 30.4 |
| Perm. Def. %,@ 50% MD | 6.50 | 7.90 | 5.55 |
| Elongation (40°F.) TD | 6.75 | 5.80 | 6.00 |

EXAMPLE 4

Blown films having a thickness of 1 to 2 mils were produced from mixtures of varying proportions of PVDC Polymer B with .2 per cent magnesium stearate added as a stabilizer, and a thermoplastic urethane polymer composed of "Estane" 5710 and 2 weight per cent ethylene bis-oleamide and 0.75 to 1.0 weight per cent diatomaceous earth. Table V displays the proportions of the polymers in each film and the oxygen permeability (by ASTM 1434-66) and permanent deformations at 40° F.

Table V

| Weight per cent, PVDC/U | 0/100 | 10/90 | 20/80 | 30/70 | 35/65 | 40/60 | 50/50 | 60/40 | 65/35 | 70/30 |
|---|---|---|---|---|---|---|---|---|---|---|
| Oxygen Permeability, cc-mil/100 in.$^2$/24 hrs./atm. | 88 | — | 62.8 | 45.5 | 29.5 | 24.9 | 10.9 | 3.9 | 3.9 | — |
| Permanent Deformation, %, at 50% Elongation MD (40°F.) TD | 3.3 1.6 | 3.3 3.3 | 5.7 4.5 | 7.5 6.8 | 8.9 8.0 | 8.4 9.2 | 13.4 15.3 | 19.0 20.9 | 20.0 24.5 | 24 Broke |

EXAMPLE 5

Blown films were prepared by procedures analogous to that described in Example 1 from varying proportion of PVDC Polymer A and thermoplastic urethane polymer composed of Pellethane 2102-70AX, 2 weight per cent ethylene bis-oleamide and 1 weight per cent diatomaceous earth. Table VI below displays the oxygen permeability (by ASTM 1434-66) and permanent deformation properties at 40° F.

Table VI

| Weight per cent PVDC/U | 0/100 | 40/60 | 50/50 | 60/40 | 70/30 | 80/20 |
|---|---|---|---|---|---|---|
| Oxygen Permeability cc. mil/100 in.$^2$/24 hrs./atm. | 272 | 94 | 90.7 | 27 | 15 | <0.5 |
| Permanent Deformation, %, at 50% MD Elongation (40°F.) TD | | 3.75 4.50 | 4.82 5.25 | 5.0 5.0 | 5.67 6.92 | 10.38 9.00 |

EXAMPLE 6

Blown films were prepared by procedures analogous to that described in Example 1 from varying proportions of PVDC Polymer B and thermoplastic urethane polymer composed of 93 parts by weight of "Estane" 5714, 1 part by weight of ethylene bis-oleamide, and 6 parts by weight of diatomaceous earth. Table VII below displays the oxygen permeability (by ASTM 1434-66) and permanent deformation properties at 40° F. of these films.

Table VII

| Weight Per Cent PVDC/U | 40/60 | 60/40 |
|---|---|---|
| Oxygen Permeability, cc. mil/100 sq.in./24 hrs./atm. | 75 | 2.5 |
| Permanent Deformation, %,@ 50% Elongation (40°F.) | 4 | 6.5 |

EXAMPLES 7–9

Several two-layer films were produced, one layer being the food wrap film of the invention and the other layer being either polyvinyl chloride or an ethylene/vinyl acetate copolymer. The two layer films were produced by procedures analogous to that described in Example 1, except that a two layer annular die was employed.

The polyvinyl chloride resin (PVC) employed was a vinyl chloride homopolymer having an intrinsic viscosity of about 1.25, measured in cyclohexanone at 30°C. For each 100 parts by weight of the polymer, the PVC resin contained 31 parts by weight of dioctyl adipate plasticizer, 7 parts by weight of epoxidized soy bean oil, and conventional stabilizers, anti-fog, and anti-block agents.

The ethylene/vinyl acetate resin (EVA) employed had a melt index of about 2.5 (by ASTM D1238), and contained 18 weight per cent vinyl acetate.

The food wrap film of this invention employed in making the two-layer films contained PVDC Polymer A and "Estane" 5710 containing 1 weight per cent diatomaceous earth and 2 weight per cent ethylene bisoleamide.

Table VIII, below, displays the description, the permanent deformation, the oxygen permeability (by ASTM 1434-66), and the thickness of each of the two-layer films.

Table VIII

| Film Identification | Perm. Def., % at 50% Elongation and 40°F. MD/TD | O$_2$ Perm., cc.mil/100 sq.in./24 hrs./atm. | Thickness, mils |
|---|---|---|---|
| 1. PVC/60% PU, 40% PVDC | 9/9 | 39 | 8–9.5 |
| 2. EVA/60% PU, 40% PVDC | 3.8/4.9 | 16.5 | 3.68 |
| 3. EVA/40% PU, 60% PVDC | 5.25/6.4 | 14.8 | 2.28 |

The actual oxygen transmission of films 1, 2 and 3 were 4.5, 4.5, and 6.5 cc/100 sq. in./24 hrs/atmos., respectively. Since neither PVC nor EVA have good oxygen barrier properties (e.g., on a "per mil" basis, the oxygen permeability of the PVC film is about 490 cc.mil/100 sq.in./24 hrs/atmos.), most of the oxygen barrier property of these three two-layer films is provided by the polyurethane/polyvinylidene chloride layer. The approximate thicknesses of the PU/PVDC layer in each of these films was the following:

| Film | Thickness of PU/PVDC Layer, mils |
|---|---|
| 1 | about 2.2 |
| 2 | about 1.8 |
| 3 | about 1 |

The food wrap film of the invention can be employed as one layer in multilayer films wherein the other layers can be composed of vinyl chloride polymers, ethylene copolymers, and other elastic film-forming polymers.

What is claimed is:

1. An elastic film having an oxygen permeability of less than 30 cubic centimeters-mil/100 square inches/24 hours/atmosphere, as determined by the test procedure of ASTM-1434-66, and permanent deformation of less than 10 per cent when stretched to 50 per cent elongation at 40°F., said elastic film consisting essentially of (a) a thermoplastic urethane polymer having a Durometer A hardness of from about 60 to about 100, and (b) a vinylidene chloride polymer, said vinylidene chloride polymer being composed of from 50 to 95 weight per cent polymerized vinylidene chloride, the remainder of said vinylidene chloride polymer being at least one polymerized monomer selected from the group consisting of vinyl chloride, alkyl acrylate, alkyl methacrylate, and acrylonitrile; wherein when said thermoplastic urethane polymer has a Durometer A hardness of from about 90 to about 100, the proportion of said thermoplastic urethane polymer in said elastic film is from about 65 to about 95 weight per cent; wherein when said thermoplastic urethane polymer has a Durometer A hardness of from about 70 to about 90, the proportion of said thermoplastic urethane polymer in said elastic film is from about 35 to about 65 weight per cent; and wherein when said thermoplastic urethane polymer has a Durometer A hardness of from about 60 to about 70, the proportion of said thermoplastic urethane polymer in said elastic film is from about 15 to about 45 weight per cent.

2. The elastic film of claim 1 wherein said remainder of said vinylidene chloride polymer includes polymerized vinyl chloride.

3. The elastic film of claim 1 wherein said vinylidene chloride polymer has an oxygen permeability of less than about 40 cubic centimeters-mil/100 square inches/24 hours/atmosphere, as determined by the test procedure of ASTM 1434-66, when formed into a film consisitng essentially of 92 weight percent of said vinylidene chloride polymer and 8 weight percent of dibutyl sebacate.

4. The elastic film of claim 1 wherein said vinylidene chloride polymer has an oxygen permeability of less than about 30 cubic centimeters-mil/100 square inches/24 hours/atmosphere, as determined by the test procedure of ASTM-1434-66, when formed into a film consisting essentially of 92 weight percent of said vinylidene chloride polymer and 8 weight percent of dibutyl sebacate.

5. The elastic film of claim 2 wherein said vinylidene chloride polymer has an oxygen permeability of less than about 30 cubic centimeters-mil/100 square inches/24 hours/atmosphere, as determined by the test procedure of ASTM-1434-66, when formed into a film consisting essentially of 92 weight per cent of said vinylidene chloride polymer and 8 weight per cent of dibutyl sebacate.

6. The elastic film of claim 1 wherein the thermoplastic urethane polymer comprises the reaction product of (a) a polyester of a dihydric alcohol and a dicarboxylic acid, and (b) an organic diisocyanate.

7. The elastic film of claim 2 wherein the thermoplastic urethane polymer comprises the reaction product of (a) a polyester of dihydric alcohol and a dicarboxylic acid, and (b) an organic diisocyanate.

8. The elastic film of claim 3 wherein the thermoplastic urethane polymer comprises the reaction product of (a) a polyester of a dihydric alcohol and a dicarboxylic acid, and (b) an organic diisocyanate.

9. The elastic film of claiim 4 wherein the thermoplastic urethane polymer comprises the reaction product of (a) a polyester of a dihydric alcohol and a dicarboxylic acid, and (b) an organic diisocyanate.

10. The elastic film of claim 5 wherein the thermoplastic urethane polymer comprises the reaction product of (a) a polyester of a dihydric alcohol and a dicarboxylic acid, and (b) an organic diisocyanate.

11. The elastic film of claim 1 wherein the thermoplastic urethane polymer comprises the reaction product of bis(4-isocyanatophenyl)methane, 1,4-butanediol, and a polyester of adipic acid and ethylene glycol.

12. The elastic film of claim 2 wherein the thermoplastic urethane polymer comprises the reaction product of bis(4-isocyanatophenyl)methane, 1,4-butanediol and a polyester of adipic acid and ethylene glycol.

13. The elastic film of claim 3 wherein the thermoplastic urethane polymer comprises the reaction product of bis(4-isocyanatophenyl)methane, 1,4-butanediol, and a polyester of adipic acid and ethylene glycol.

14. The elastic film of claim 4 wherein the thermoplastic urethane polymer comprises the reaction product of bis(4-isocyanatophenyl)methane, 1,4-butanediol, and a polyester of adipic acid and ethylene glycol.

15. The elastic film of claim 5 wherein the thermoplastic urethane polymer comprises the reaction product of bis(4-isocyanatophenyl)methane, 1,4-butanediol, and a polyester of adipic acid and ethylene glycol.

16. A bag fabricated from the film of claim 1.

17. The film of claim 1 wherein said film is one layer of a multi-layer elastic film.

* * * * *

UNITED STATES PATENT OFFICE
CERTIFICATE OF CORRECTION

Patent No. 3,879,330      Issue Date April 22, 1975

Inventor(s) Stanley Lustig

It is certified that error appears in the above-identified patent and that said Letters Patent are hereby corrected as shown below:

Column 2, line 1, "ot" should read --of--.

Column 3, line 64 "5705" should read --5707--.

Column 12, Claim 9, line 13 "claiim" should read --claim--.

Signed and sealed this 15th day of July 1975.

(SEAL)
Attest:

RUTH C. MASON
Attesting Officer

C. MARSHALL DANN
Commissioner of Patents
and Trademarks